MAGNETIC PULSE CONTROLLING DEVICE

Filed May 17, 1954 3 Sheets-Sheet 1

| R | 0 | 1 |
|---|---|---|
| 0 | 0 | 1 |
| 1 | 1 | 0 |

INVENTORS
John D. Goodell
Tenny Lode
BY
Bailey, Stephens and Huettig
Attorneys

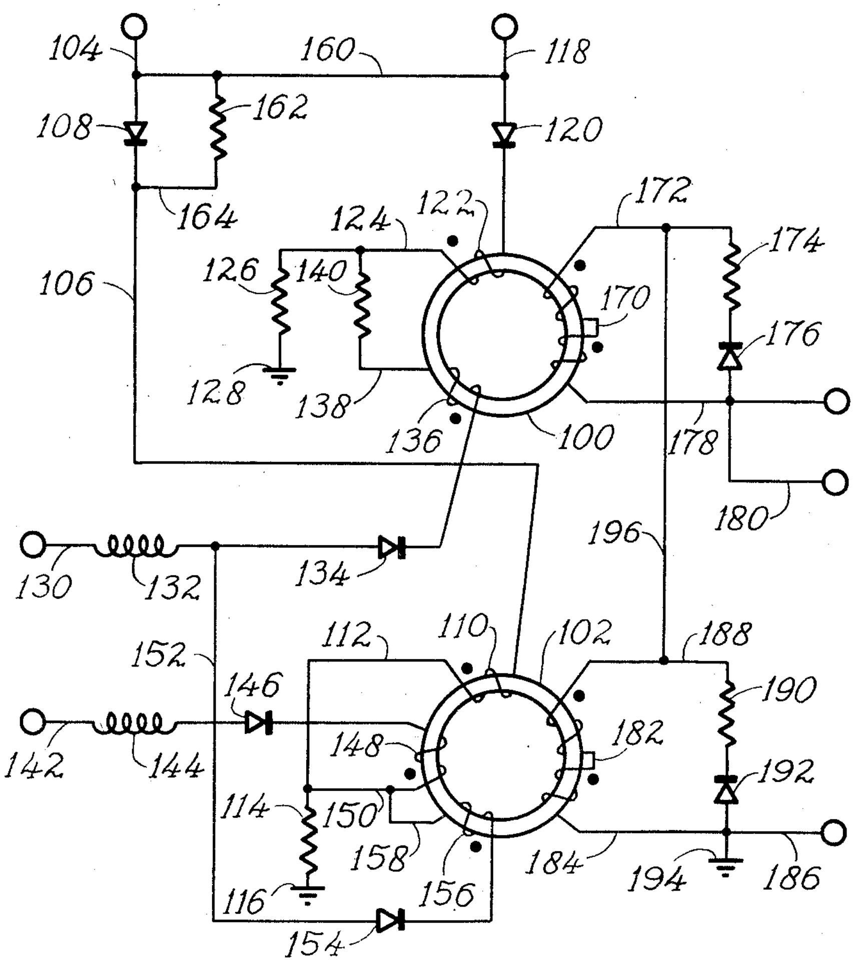
Fig. 4
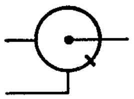
Fig. 5
| K | 0 | 1 |
|---|---|---|
| 0 | 0 | 0 |
| 1 | 0 | 1 |
Fig. 6
INVENTORS
John D. Goodell
Tenny Lode
BY
Bailey, Stephens and Huettig
Attorneys

MAGNETIC PULSE CONTROLLING DEVICE

Filed May 17, 1954 3 Sheets-Sheet 3

Inventors
John D. Goodell
Tenny Lode
By Bailey, Stephens and Huettig
Attorneys

United States Patent Office 2,846,667

Patented Aug. 5, 1958

2,846,667

MAGNETIC PULSE CONTROLLING DEVICE

John D. Goodell and Tenny Lode, St. Paul, Minn., assignors, by mesne assignments, to Librascope, Incorporated, a corporation of California Application May 17, 1954, Serial No. 430,186

7 Claims. (Cl. 340—174)

This invention relates to magnetic components for information processing machines. In particular, the invention is directed to the construction of magnetic pulse controlling elements designated as K and R elements.

In the co-pending application of Goodell and Lode, Serial No. 398,658 for "Information Processing Machines," filed December 17, 1953, and now abandoned and in application, Serial Number 531,874, filed September 1, 1955, as a continuation of application Serial Number 398,658 a computing machine system has been disclosed in which magnetic pulse controlling elements are used. The objects of the instant invention are to produce magnetic pulse controlling elements which are compatible in the system disclosed in the aforesaid application, and in the use of which reduces the total number of elements necessary in the system, and increases the flexibility thereof. A further object of the invention is to produce a magnetic pulse controlling element designated as K which has the logical function of conjunction. That is, it will respond with an output 1 if, and only if, there is a coincidence of a 1 at both input lines. Under all other conditions, it responds with a 0.

In general, these objects are achieved by combining two or more magnetic elements by electrical circuits so that pulses in the input lines and those produced through the magnetic elements from the clock pulse source selectively cancel each other.

The means by which the objects of the invention are achieved are described more fully with reference to the accompanying drawings, in which.

Figure 3A:
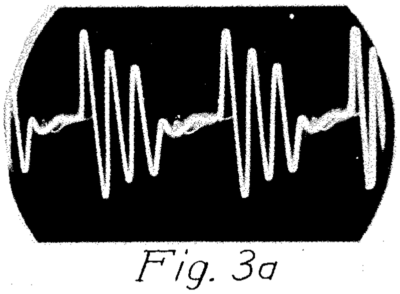

Figures 3*a*, *b*, *c*, and *d* are oscilloscope curves illustrating the signals on the output line of the R decision element;

Figure 4 is a circuit diagram of a K pulse controlling element;

Figure 5 is a symbolic illustration of the function of this K element;

Figure 6 is a table showing the function of the K element; and

Figure 6A:
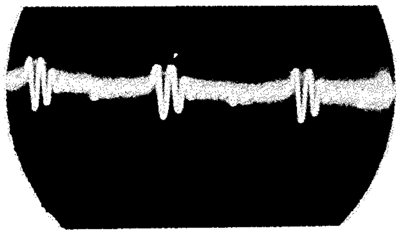

Figures 6*a*, *b*, *c*, and *d* are oscilloscope curves illustrating the signals on the output line of pulse controlling element K.

Figure 1:
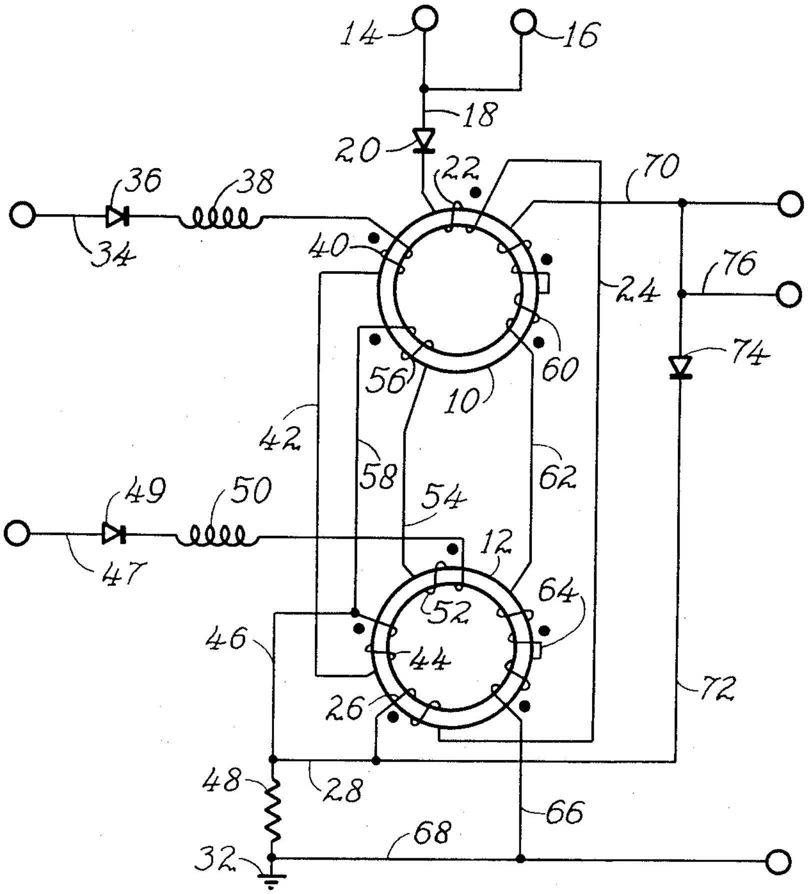
Figure 1 is a circuit diagram for a R decision element.
Figures 2, 3:
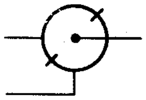
Figure 2 is the symbolic illustration of the function of the R element.
Figure 3 is a table further showing the function of the element.

In Figure 1 the decision element is composed of magnetic cores 10 and 12. From clock terminals 14 and 16, connected in parallel, clock pulses are passed through line 18 containing diode 20 into clock winding 22 on core 10 and then through line 24 into clock winding 26 on core 12 and then through line 28 and resistance 48 to ground 32.

An input pulse originating on input line 34 containing diode 36 and choke 38 is conducted through input winding 40 on core 10 and then through line 42 to series connected input winding 44 on core 12 and then through line 46 and resistance 48 to ground 32.

A pulse on input line 47 containing diode 49 and choke 50 is passed to input winding 52 on core 12 and then through line 54 to series connected winding 56 on core 10 and then on line 58 to line 46 and resistor 48 to ground 32.

An output winding 60 on core 10 is series connected through line 62 to an output winding 64 on core 12, which latter winding is connected through lines 66 and 68 to ground 32. From output winding 60 line 70 leads to the output and it is connected through line 72, containing diode 74 to line 28, resistor 48, and ground 32. As shown, two output terminals are provided, one being line 70, and the other being line 76 connected to line 72.

This circuit will produce an output pulse in lines 70 and 76 only if an input pulse has occurred at either, of input lines 34 and 47. The input circuit is inhibited from producing an output pulse if there is an input pulse on more than one input line.

Just as in the A elements, if no input occurs on lines 34 or 47, there is no change in cores 10 and 12 during input time. Now on the next clock pulse each core is again driven in the direction in which it is already saturated, so that only minor pulses are received in windings 60 and 64 which are too small to produce a useable output pulse in line 70.

If an input pulse is now received on line 34, and a 0 on line 47, the core 10 is driven and current flows through line 42 to winding 44 to tend to drive core 12 in an opposite direction, which is the direction in which it is already saturated so that no effective change is made in the core. The next clock pulse now drives core 10 from its input pulse set position to opposite saturation by current flowing in winding 22, and core 12 is not affected and remains in its previous set position. The flux change in core 10 produces an output pulse in winding 60, because core 12 has not moved to produce any significant pulse in winding 64. The output pulse appears on lines 70 and 76, the amplitude of this pulse being regulated by diode 74.

If an input pulse is received at line 47, and a 0 at 34, the roles of cores 10 and 12 are reversed, and an output pulse is produced in lines 70 and 76, the functions of windings 60 and 64 being reversed.

If pulses are received on input lines 34 and 47, simultaneously, a pulse in line 34 energizes winding 40, but this is opposed by the pulse in line 47 which energizes winding 56 in an opposite direction. Similarly, the energizing of winding 52 by the pulse in line 47 is opposed by the energizing of winding 44 in an opposite direction by the pulse from line 34. Consequently, neither core 10 nor 12 is driven, and no output pulse appears on lines 70 and 76, when the cores are again excited by the clock pulse.

The function of the diode 74 in stabilizing the amplitude of the output pulse is similar to the stabilized circuit disclosed in the co-pending application of Hardenbergh et al. for "Decision Elements A and S," filed concurrently herewith. The copending application of Hardenburgh, et al. may be identified as application Serial Number 430,187, filed May 17, 1954 for "Magnetic Pulse Controlling Device."

Figure 3B:
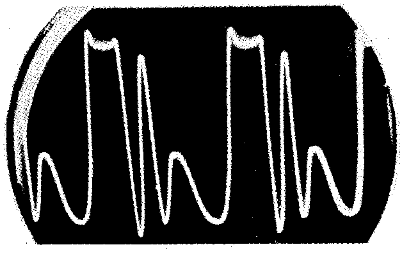
Figure 3C:
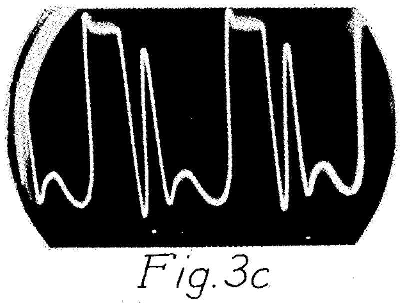
Figure 3D:
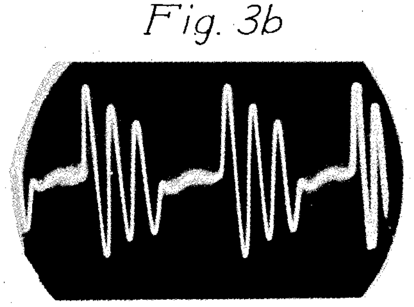

The function of the R element is illustrated in Figures 3*a*, *b*, *c* and *d*, where the circuit is tapped across winding 60 and ground 32. Figure 3*a* represents a 0 on each input line, no effective output pulse being produced during clock time. In Figures 3*b* and 3*c*, respectively, a pulse has been received on one input line and a 0 on the other line, and vice versa, the large positive pulses showing that an output pulse has occurred. In Figure 3*d* an input pulse has been received on each input line, and cancellation has occurred, there being no output pulse.

The circuit components are as follows:

Cores 10 and 12 are each composed of 3/16" diameter Toroid having 20 wraps of 1/8"×0.000125" 4–79 Mo Permalloy ribbon (rectangular annealed). The wire used for the windings is No. 39 wire. The number of turns on the various windings is as follows:

| | | |
|---|---|---|
| Windings: | | |
| **22** and **26** | turns | 75 |
| **40** and **44** | do | 75 |
| **56** and **52** | do | 75 |
| **60** and **64** | do | 150 |
| Resistance | ohms | 470 |
| Chokes **38** and **50** | μh | 500 |
| Diodes | | IN69 |

The K pulse controlling element of Figure 4 is composed of two cores 100 and 102. The logical function of this element is conjunction. That is, the K element produces an output 1 only upon the coincidence of a 1 input on both of the input lines. A positive pulse from clock line 104 travels through line 106 containing diode 108 to clock winding 110 on core 102, and then through line 112 containing resistance 114 to ground 116. For core 100, a clock pulse in clock line 104 through line 160 and diode 120 goes through clock winding 122 on core 100 and then through line 124 containing resistance 126 to ground 128. An alternate clock phase pulse may be provided through clock line 118.

Assuming that the clock pulse from either clock lines 104 or 118 has just driven cores 100 and 102 to positive saturation, and no input is received on input lines 130 or 142, there will be some signal received in core 102 through winding 110 by virtue of resistance 162, due to the negative clock pulse occurring during input time. The next positive clock pulse energizes winding 110 and produces a small signal in winding 182. This causes a small negative signal in line 196 which is not less than the signal in winding 170, and creates a non-positive signal in output line 180.

During the next input time, if an input pulse is produced on line 130, and a 0 on line 142, the pulse in line 130, goes through choke 132, diode 134, winding 136, line 138, resistors 140 and 126, to ground 128. This pulse drives core 100 to negative saturation. This pulse also goes through line 152, diode 154, winding 156 of core 102, lines 158 and 150 containing resistor 114 to ground 116, and drives core 102 to its negative saturation. The next positive clock pulse causes a flux change in both 100 and 102 and drives these cores to positive saturation. A pulse is thus created in winding 182 of core 102, and winding 170 in core 100. The signal in winding 182 appears as a negative pulse in line 196 and 172. The negative pulse is produced because of the differential connections of the windings 170 and 182 in a circuit including the line 178, the winding 170, the lines 172 and 196, the winding 182 and the line 184. The signal in winding 170 is of equal magnitude and opposite polarity in this circuit to the signal received from winding 182 so that cancellation occurs, and no signal appears on lines 178 and 180.

If a pulse appears on line 142 and a 0 on line 130, and the clock has previously driven cores 100 and 102 to positive saturation, the pulse travels through choke 144, diode 146, coil 148, line 150, resistor 114 to ground 116. It attempts to drive core 102 in the same direction as previously saturated by the clock pulse, so that no flux change occurs in core 102. Since no pulse appears on line 130, there is no input on core 100 during this input time. Thus, as the magnetic condition of either core has not been changed, no output pulse is produced on either winding 170 or 182 by the next following clock pulse.

With no signal on winding 182, lines 196 and 172 are essentially at ground potential, and since there is no signal on winding 170, line 178 is at essentially ground potential, and there is no output signal on lines 178 and 180.

When pulses are received on both lines 130 and 142 simultaneously during input time, windings 136, 148 and 156 are energized by the circuits previously described. The pulse in winding 136 drives core 100 to negative saturation. The pulses in windings 148 and 156 are in opposition and thus cancel out so no net flux change occurs in core 102. The next positive clock pulse produces a pulse in winding 170 of core 100 and since core 102 has remained in its previously saturated condition, no pulse is produced in output winding 182. Since no signal appears on winding 182, lines 196 and 172 are essentially at ground potential and the signal on winding 170 appears on lines 178 and 180 as a normal output signal pulse.

The purpose of the output circuit connected to the output terminals of the output windings 170 and 182 of cores 100 and 102, respectively, is to synchronize the rate of flux change in the cores when an output signal appears in the cores so as to achieve cancellation, as in the case when a 1 appears on line 130 and a 0 is on line 142.

When the core 100 is driven to negative saturation by an input pulse, the polarity of the signal appearing in winding 170 will be in the non-conducting direction with respect to diode 176 in line 172 having resistor 174, and the circuit is inoperative. Likewise for core 102 having output line 188 including resistor 190 and diode 192.

If an output pulse occurs in both windings 170 and 182 during clock output time, a current flows in line 178 through diode 176, resistor 174 and back through winding 170, thus putting a stabilizing load on the output winding 170. The same occurs for a current appearing in line 184 of core 102.

A reason for stabilizing the wave shape of the output pulses on windings 170 and 182 is to ensure their cancellation when combined in the output circuit. At other times it serves merely as a stabilizing load for the core which may be operating.

Figure 6B:
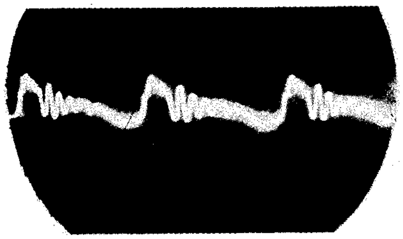
Figure 6C:
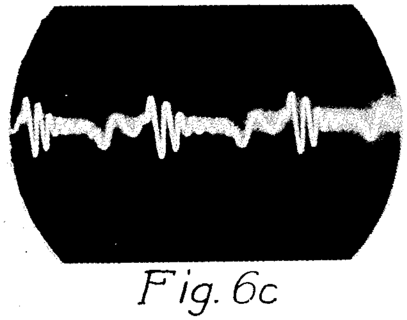
Figure 6D:
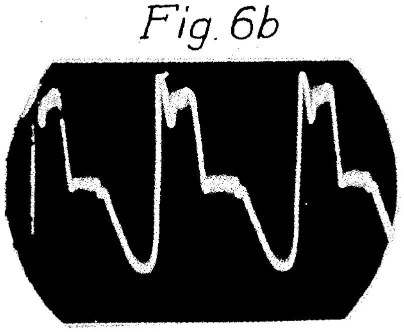

The output signals produced by the K element are shown in Figures 6*a*, *b*, *c*, and *d*, and oscilloscope curves being taken by tapping the element across line 178 and ground 116. In Figure 6*a*, a 0 on each input line results in a 0 on the output line. In Figures 6*b* and 6*c*, a 0 on one input line and a 1 on the other input line, and vice versa, results in a 0 on the output line. In Figures 6*d*, a 1 on each input line produces a 1 on the output line as shown by the squared peaks, and conjunction is thus achieved.

The values for the various components are as follows:

The core is the same as in the R circuit of Figure 1. The windings are as follows:

| | | |
|---|---|---|
| Winding: | | |
| **122** | turns | 75 |
| **136** | do | 75 |
| **170** | do | 150 |
| **110** | do | 75 |
| **148** | do | 75 |
| **156** | do | 75 |
| **182** | do | 150 |
| All diodes are IN69 | | |
| Chokes **132** and **144** | μh | 500 |
| Resistor **162** | ohms | 4,700 |
| Resistor **126** | do | 330 |
| Resistor **140** | do | 470 |
| Resistor **174** | do | 2,700 |
| Resistor **114** | do | 470 |
| Resistor **190** | do | 2,700 |

Thus, it has been shown that this K element will produce an output 1 if, and only if, there has been an input 1 simultaneously on both input lines.

Having now described the means by which the objects of the invention are obtained, we claim:

1. A magnetic pulse controlling element comprising a pair of first and second magnetic cores, each capable of becoming magnetically saturated in each of two opposite states and of retaining the magnetic saturation in each of the two opposite states at least two input lines, means for connecting one input line to a first core and to a second core to magnetize said cores with a flux change in one direction when an input pulse occurs on said one input line, means for connecting the other input line to one of said cores to magnetize said core with a flux change in the opposite direction when an input pulse occurs on said other input line, clock means connected to said cores for magnetizing said cores with a flux change in the opposite direction during intervals of time alternated with input pulse time, and output line means connected to said cores for selectively producing an output pulse during clock pulse time in dependence upon the presence of an input pulse upon both input lines during input pulse time.

2. A magnetic pulse control device for producing an output signal in response to a coincidence of input signals comprising first and second saturable cores each magnetizable alternatively to two opposite states and each capable of providing magnetic remanence in each of its two opposite states, means comprising two windings one on each of said cores adapted to be energized by a first signal to change both of said cores from one of said states to the opposite state, means comprising a winding on one of said cores adapted to be energized by a second signal to change the core on which said winding is disposed to a state opposite to the state to which both of said cores are adapted to be changed by energization of the aforesaid two windings, means comprising a pair of windings one on each of said cores adapted to be energized by an actuating pulse to change both of said cores to a state opposite to the state to which both of said cores are adapted to be changed by energization of said first mentioned two windings, and output windings one on each of said cores each adapted to be inductively energized from one of said pair of windings whenever the energization of said pair of windings effects a change of state of the core upon which it is disposed; said output windings being interconnected so that currents so induced therein flow in opposite directions through said interconnection.

3. A magnetic pulse control device for producing an output signal in response to a coincidence of input signals comprising first and second cores, each saturable with magnetic fluxes of first and second polarities and each capable of retaining such magnetic fluxes, first windings on each of the cores, a supplemental winding on the second core, first means for applying first input pulses to the first windings to produce magnetic fluxes of the first polarity in the cores, means for applying second input pulses to the supplemental winding on the second core to obtain the production of magnetic flux of the second polarity in the core, the first windings in the first and second cores and the supplemental winding being connected to the first and second pulse means to obtain the production of flux of first polarity in the first core and the production of magnetic fluxes of opposite polarities in the second core for a neutralization of the flux production in the second core upon the introduction of first and second input pulses to the windings, second windings on the first and second cores, means for applying clock pulses to the second windings on the first and second cores to produce magnetic fluxes of the second polarity in the cores, and third windings on the first and second cores and connected in a circuit to produce an output pulse upon the introduction of a clock pulse to the second windings and only upon the prior introduction of the first and second input pulses to the first windings and the supplemental winding.

4. The magnetic pulse control device set forth in claim 3 in which the third windings have output pulses of the same polarity induced in them upon the introduction of the clock pulses to the second windings, and in which the third windings are connected on a differential basis to produce an output pulse only upon the prior introduction of input pulses to the first windings and the supplemental winding.

5. The magnetic pulse control device set forth in claim 3, in which unidirectional means are connected to the first windings, the supplemental winding and the second windings to control the direction in which pulses can be applied to the windings.

6. The magnetic pulse control device set forth in claim 3 in which unidirectional means are connected in circuits with the third windings to inhibit the production of output pulses by the windings at the time of introduction of the input pulses to the first windings and the supplemental winding.

7. The magnetic pulse control device set forth in claim 3 in which first unidirectional means are connected to the first windings, the supplemental winding and the second windings to control the direction in which pulses can be applied to the windings, in which second unidirectional means are connected in circuits with the third windings to inhibit the production of output pulses by the windings at the time of introduction of the input pulses to the first windings and the supplemental winding and in which the third windings have output pulses of the same polarity induced in them upon the introduction of the clock pulses to the second windings, and in which the third windings are connected on a differential basis to produce an output pulse only upon the prior introduction of input pulses to the first windings and the supplemental winding.

References Cited in the file of this patent

UNITED STATES PATENTS

| | | |
|---|---|---|
| 2,695,993 | Haynes | Nov. 30, 1954 |
| 2,729,807 | Paivinen | Jan. 3, 1956 |

OTHER REFERENCES

Publication I entitled, "Magnetic Binaries in The Logical Design of Information Handling Machines" by Saunders, published in the Proceedings of Association for Computing Machinery, May 1952. (Pages 226–228 relied upon.)